April 30, 1963  J. A. RICKARD  3,088,030
SCINTILLATOR
Filed Dec. 7, 1956  2 Sheets-Sheet 1
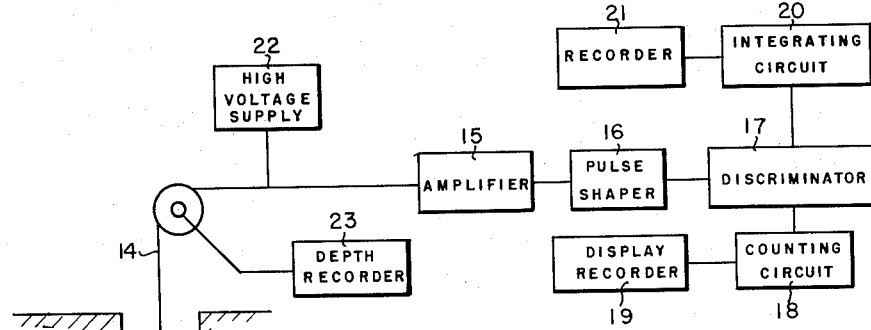
FIG. 1.
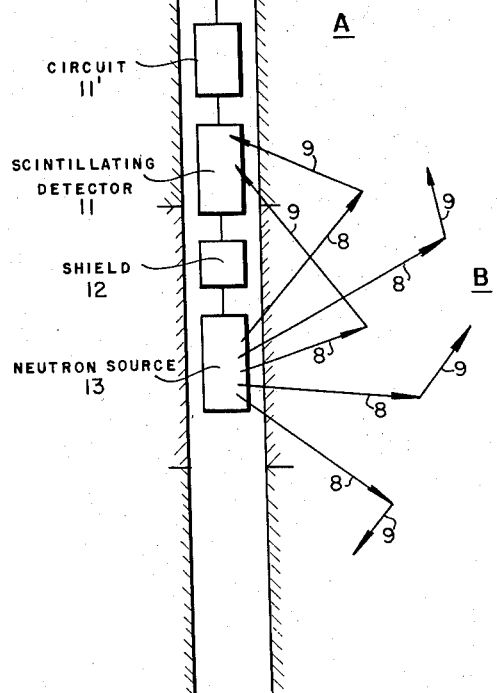
INVENTOR.
JAMES A. RICKARD.
BY
ATTORNEY.

April 30, 1963  J. A. RICKARD  3,088,030
SCINTILLATOR
Filed Dec. 7, 1956  2 Sheets-Sheet 2
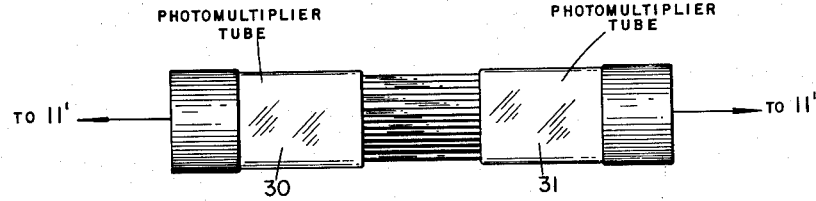
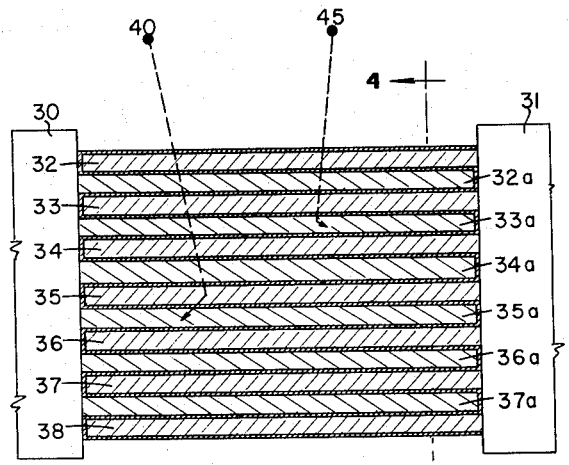
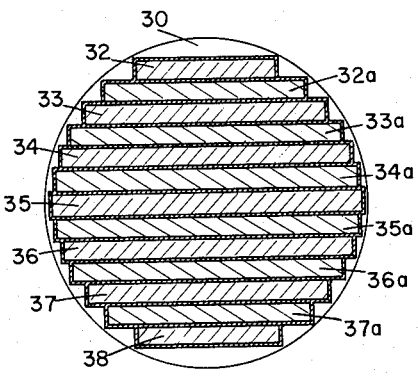
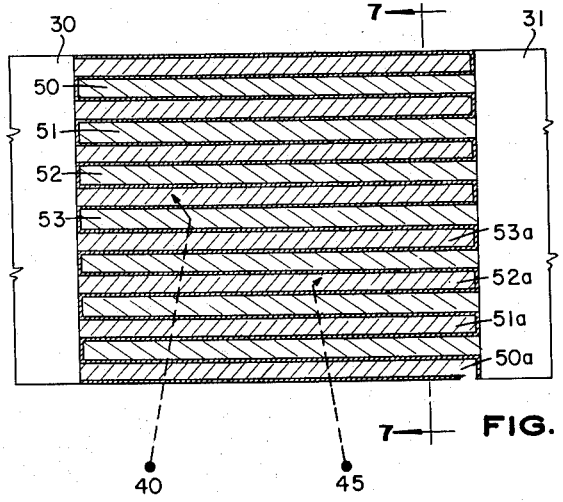
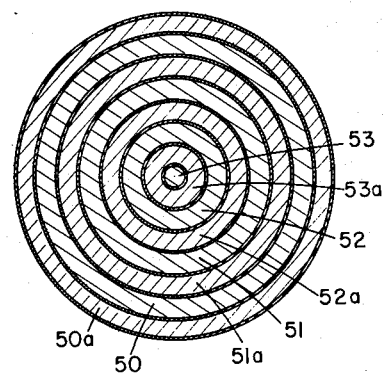
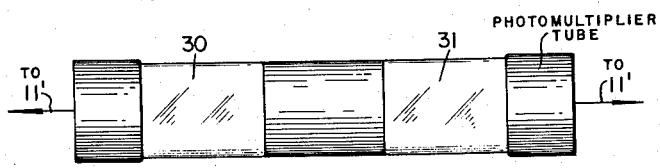
INVENTOR.
JAMES A. RICKARD,
BY
John D. Schneider
ATTORNEY.

United States Patent Office 3,088,030
Patented Apr. 30, 1963

3,088,030
SCINTILLATOR
James A. Rickard, Bellaire, Tex., assignor, by mesne assignments, to Jersey Production Research Company, Tulsa, Okla., a corporation of Delaware
Filed Dec. 7, 1956, Ser. No. 626,883
3 Claims. (Cl. 250—71.5)

This invention is directed broadly to scintillation counters which generate light rays upon interaction with radioactive particles. More specifically this invention is directed to distinguishing the ionization produced or generated in an ionization type scintillation counter by neutrons in contradistinction to gamma-rays or vice-versa. In its more particular aspects this invention concerns identifying subsurface formations by distinguishing between radiation such as gamma-rays and neutrons.

Knowledge of the general nature of a subsurface formation can be obtained by noting generally the effect of the formation on incident primary radiation. However, a much greater knowledge of the nature of the subsurface formations may be obtained by measurement of the energy of the induced secondary particles produced by the primary radiation. Certain substances when bombarded by primary radiation emit characteristic secondary radiation. Since the radiation from two different substances may be identical in all respects except energy, a measurement of energy is essential to determine which substances are present in the formation. In my copending patent application Serial No. 534,234 filed September 14, 1955, now abandoned, a method of observing radiation derived from nuclear reactions to determine the presence and amounts of substances in the subsurface formations is discussed. The methods of actually observing and measuring secondary radiation vary somewhat according to the type of radiation. For example, for the detection of fast induced neutrons and gamma-rays, various types of proportional counters and scintillation counters are employed.

In the use of scintillation counters, which depend on ionizing events to emit light rays which, in turn, are converted to electrical pulses proportional in amplitude to the original energy of the incoming radiation which interacts with the scintillation material, the ionization in the case of gamma-rays is produced by recoil electrons and in the case of neutrons the ionization is produced by recoil protons or heavier atoms. The light rays produced by the ionization caused by gamma-rays and neutrons are very similar and it is difficult to distinguish between the pulses produced by light rays generated by neutrons and those generated by gamma-rays.

Often it is desirable to distinguish electrical pulses produced by gamma-rays from pulses produced by neutrons. In my copending patent application, cited above, for example, there is disclosed a method of logging wherein primary neutrons from a source penetrate the earth formation, producing therein secondary gamma-rays, some of which strike the detector. Some primary neutrons will be deviated from their straight line path into the formation and will also strike the detector. Also, some secondary neutrons will be produced in the formation and they, too, may strike the detector. If it were desired to detect only gamma-rays, then the neutrons would constitute an undesirable background, and vice-versa. Thus by providing means for detecting only gamma-rays to the exclusion of neutrons, or vice-versa, the apparatus described herein supplies a distinct contribution and improvement in the art.

Thus an object of my invention is to provide apparatus which distinguishes between electrical pulses caused by gamma radiation and electrical pulses caused by neutrons.

Briefly, my invention is a scintillation counter comprising spaced apart means adapted to convert light rays to electrical pulses; a plurality of scintillating means are positioned between said converting means adapted to generate light rays upon interaction with incoming radiation; each of said scintillating means being constructed such that the path length of a recoil electron of a given energy is greater than the width or thickness of each scintillating means which, in turn, is greater than the path length of a recoil proton of a given energy. The scintillating means are coated with a reflective substance opaque to light and arranged for coincidence or for anti-coincidence counting. The electrical pulses are transmitted to pulse analyzing means adapted to measure the amplitude and the number of the electrical pulses. The amplitude of the electrical pulse is proportional to the energy of the incoming radiation to be measured and the number of pulses per unit of time indicates the intensity of such radiation.

Referring briefly to the drawings:
FIG. 1 is a schematic representation of the subsurface and surface apparatus employed with my invention;
FIG. 2 is a schematic showing of one embodiment of the detector element;
FIG. 3 is a vertical cross-sectional view of the embodiment of FIG. 2;
FIG. 4 is a view taken on lines 4—4 of FIG. 3;
FIG. 5 is a schematic showing of another embodiment of the detector element;
FIG. 6 is a vertical cross-sectional view of the embodiment of FIG. 5;
FIG. 7 is a view taken on lines 7—7 of FIG. 6.

Referring to the drawings in greater detail, in FIG. 1 is shown a borehole 10 penetrating a plurality of subsurface formations A and B. A scintillating detector 11, a coincidence or anti-coincidence circuit 11', a shield 12 and a primary source of radiation 13, which may suitably be a neutron source, are positioned on an electrically conductive cable 14 which is adapted to be raised and lowered in the borehole 10. At the surface of the earth, the conductor 14 connects to an amplifier 15, a pulse shaper 16 and a discriminator 17. From the discriminator 17, the conductor cable 14 may be either connected to a counting circuit 18 and a display recorder 19 or to an integrating circuit 20 and a recorder 21. A high voltage supply 22 is shown connected to conductor 14 and if desired a suitable depth recorder 23 may be utilized to show the depth of the subsurface equipment at any particular time.

As seen in FIGS. 2 and 5 the detector 11 includes spaced apart photomultiplier tubes 30 and 31 between which are positioned scintillation crystals, as seen in detail in FIGS. 3, 4, 6 and 7.

In the embodiment of FIGS. 2, 3 and 4, a plurality of elongated crystal wafers 32 to 38 and 32a to 37a extend linearly between photomultiplier tubes 30 and 31. The crystal wafers are coated with a substance opaque to light on all surfaces thereof except the ones which contact the photomultiplier tubes and arranged so that light rays generated in adjacent crystal wafers enter different photomultiplier tubes. Thus light rays generated in crystal wafers 32 to 38 can enter only tube 31 and light rays generated in crystal wafers 32a to 37a can enter only tube 30.

In the embodiment of FIGS. 5 and 7, a plurality of cylindrically configured crystals 50 to 53 and 50a to 53a are positioned between photomultiplier tubes 30 and 31. As in the previous embodiment, the crystals are coated with a substance opaque to light on all surfaces thereof except the ones which contact the photomultiplier tubes and arranged so that light rays generated in adjacent crystals enter different photomultiplier tubes. Thus light rays generated in crystals 50 to 53 can enter only tube 31 and light rays generated in crystals 50a to 53a can enter only tube 30.

In each of the embodiments the construction and arrangement of the crystals is designed to enable distinguishing between pulses produced by gamma-rays and pulses produced by neutrons. The track of a recoil proton (the ionization produced by neutrons) is very short compared to the track or path of an electron of the same energy (ionization produced by gamma-rays). The distance between adjacent or successive wafers (FIGS. 2, 3 and 4) or concentric shells (FIGS. 5, 6 and 7) is such that $P_e$ is greater than L is greater than $P_p$ where $P_e$ is equivalent to the path length of an electron of a given energy, $P_p$ is equivalent to the path length of a proton of a given energy and L is equivalent to the width or thickness of an individual wafer or shell. The two photomultiplier tubes 30 and 31 are arranged in either a conventional coincidence circuit or a conventional anti-coincidence circuit. Thus, there is a high probability that the recoil electrons from gamma-rays will penetrate two wafers or two cylindrical shells and thus produce photons that both photomultiplier tubes can see. Recoil protons from neutrons, however, have a high probability of losing all their energy in one annular spacing or in one wafer and hence will cause a pulse in only one photomultiplier. Obviously, the coincidence or anti-coincidence arrangements should be selectively employed depending upon whether it is desired to count gammas in the presence of neutrons or vice-versa. The annular spacing or width L of the individual wafers or shells will depend on the energy of the detected radiation particles; however, as an example of the order of magnitude of L three mev. (million electron volts) secondary neutrons and gamma rays may be considered. The three mev. electrons produced by three mev. gamma-rays will penetrate approximately 1.0 centimeters of an organic phosphor (a conventional type of scintillating material). A three mev. proton produced by recoil by three mev. neutrons will penetrate approximately 0.017 centimeter of the same organic phosphor. Therefore, in such a case $P_e=1.0$ centimeters or 0.4 inch, $P_p=0.017$ centimeter or 0.0067 inch; hence, L may suitably =0.1 centimeter or 0.04 inch. In general a selection of $L=0.1$ centimeter should be adequate for detecting secondary radiation whose energy is up to ten million electron volts which should be adequate for normal usage.

In operation as seen in FIG. 1, the apparatus is lowered in the borehole and subsurface formations A and B are bombarded by primary radiation emitted from source 13 as designated by the arrowed lines 8. The induced secondary neutrons and gamma-rays produced by the nuclear reactions in the formation as designated by the arrowed lines 9 enter detector 11. As seen in FIGS. 3 and 4, an induced gamma-ray 40 penetrates a crystal 35 and the electrons generated thereby will, in turn, generate light in crystals 35 and 35a. On the other hand, a neutron 45 penetrates crystal 33a producing by ionization protons which generate light in only crystal 33a. A similar action occurs in the embodiment of FIGS. 6 and 7 wherein a neutron 45 penetrates crystal shell 52a and the ionization product protons generate light in only 52 and the gamma-rays 40 penetrating crystal 53 produce ionization product electrons which generate light in crystals 53 and 53a. The operation of the coincidence or anti-coincidence circuit 11' is such that pulses from the output of photomultiplier tubes 30 and 31 count only when the tubes are simultaneously affected (in coincidence counting) or count only when the tubes are not simultaneously affected (anti-coincidence counting). Such circuits are known, hence a detailed description of their operation is considered unnecessary. The output of the coincidence circuit or anti-coincidence circuit 11' is transmitted to amplifier 15, pulse shaper 16 and discriminator 17 (wherein pulses of selected amplitude are passed through). From the discriminator the pulses of selected amplitude may be transmitted to an integrating circuit 20 and recorder 21 or to a counting circuit 18 and display recorder 19 or to other pulse analyzing means well known to the art, such as photographic analysis of an oscilloscope pulse display.

For convenience in describing the invention the scintillating means were designated as crystals. However, it is to be understood that the scintillating means may be any of the luminescent materials termed "phosphors." The molecules of such materials radiate energy in the form of light when excited and ionized by a charged particle.

Having fully described the nature, objects and elements of my invention, I claim:

1. A scintillation detector adaptable for use in radiation well logging wherein subsurface earth formations surrounding a borehole are bombarded with primary radiation and the energies of the induced secondray particles produced thereby are measured in order to obtain information concerning subsurface substances contained in the subsurface formations comprising:

two spaced-apart photomultipliers, each adapted to convert light rays into electrical pulses;

more than two contiguous scintillating means arranged between said photomultipliers adapted to generate light rays upon interaction with induced neutron and gamma ray particles, each of said scintillating means being constructed such that the path of electrons in the material of said scintillating means of a given energy produced by said gamma ray particles is greater than the thickness of an individual scintillating means while the path of protons in the material of said scintillating means of a given energy produced by said neutrons is less than the thickness of an individual scintillating means;

the surface of each of said scintillating means being selectively coated with a substance opaque to light such that said scintillating means are optically isolated from each other and adjacent scintillating means are optically coupled to different photomultipliers; and pulse analyzing means connected to said photomultipliers adapted to measure said electrical pulses.

2. A scintillation detector adaptable for use in radiation well logging wherein subsurface earth formations surrounding a borehole are bombarded with primary radiation and the energies of the induced secondray particles produced thereby are measured in order to obtain information concerning subsurface substances contained in the subsurface formations comprising:

two spaced-apart photomultipliers, each adapted to convert light rays into electrical pulses, arranged for coincidence counting in order to count gamma radiation in the presence of neutrons;

more than two contiguous scintillating means arranged between said photomultipliers adapted to generate light rays upon interaction with induced neutron and gamma ray particles, each of said scintillating means being constructed such that the path of electrons of a given energy produced by said gamma ray particles in the material of said scintillating means is greater than the thickness of an individual scintillating means which in turn is greater than the path of protons of a given energy produced by said neutrons in the material of said scintillating means;

the surface of each of said scintillating means being selectively coated with a substance opaque to light such that said scintillating means are optically isolated from each other and adjacent scintillating means are optically coupled to different photomultipliers; and pulse analyzing means connected to said photomultipliers adapted to measure said electrical pulses.

3. A scintillation detector adaptable for use in radiation well logging wherein subsurface earth formations surrounding a borehole are bombared with primary radiation and the energies of the induced secondary particles produced thereby are measured in order to obtain information concerning subsurface substances contained in the subsurface formations comprising:

two spaced-apart photomultipliers, each adapted to convert light rays into electrical pulses, arranged for anticoincidence counting in order to count neutrons in the presence of gamma radiation;

more than two contiguous scintillating means arranged between said photomultipliers adapted to generate light rays upon interaction with induced neutron and gamma ray particles, each of said scintillating means being constructed such that the path of electrons of a given energy produced by said gamma ray particles in the material of said scintillating means is greater than the thickness of an individual scintillating means, which in turn is greater than the path of protons of a given energy produced by said neutrons in the material of said scintillating means;

the surface of each of said scintillating means being selectively coated with a substance opaque to light such that said scintillating means are optically isolated from each other and adjacent scintillating means are optically coupled to different photomultipliers; and pulse analyzing means connected to said photomultipliers adapted to measure said electrical pulses.

References Cited in the file of this patent
UNITED STATES PATENTS

| | | |
|---|---|---|
| 2,508,772 | Pontecorvo | May 23, 1950 |
| 2,666,145 | Eversole et al. | Jan. 12, 1954 |
| 2,725,484 | McKee | Nov. 29, 1955 |
| 2,725,485 | Scherbatskoy | Nov. 29, 1955 |
| 2,740,898 | Youmans | Apr. 3, 1956 |
| 2,799,780 | Ruderman | July 16, 1957 |
| 2,830,184 | Scherbatskoy | Apr. 8, 1958 |
| 2,830,186 | Scherbatskoy | Apr. 8, 1958 |
| 2,830,189 | Scherbatskoy | Apr. 8, 1958 |
| 2,881,324 | Scherbatskoy | Apr. 7, 1959 |

OTHER REFERENCES

Albert: Review of Scientific Instruments, vol. 24, No. 12, December 1953, pp. 1096–1101.